(12) United States Patent
Shen et al.

(10) Patent No.: US 12,444,447 B2
(45) Date of Patent: Oct. 14, 2025

(54) DIGITAL PHASE CHANGE MEMORY (PCM) ARRAY FOR ANALOG COMPUTING

(71) Applicant: International Business Machines Corporation, Armonk, NY (US)

(72) Inventors: Tian Shen, Clifton Park, NY (US); Kevin W. Brew, Niskayuna, NY (US); Heng Wu, Guilderland, NY (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 17/565,137

(22) Filed: Dec. 29, 2021

(65) Prior Publication Data
US 2023/0206964 A1    Jun. 29, 2023

(51) Int. Cl.
| | |
|---|---|
| G11C 7/10 | (2006.01) |
| G06F 17/16 | (2006.01) |
| G11C 7/12 | (2006.01) |
| G11C 7/16 | (2006.01) |
| G11C 8/08 | (2006.01) |

(52) U.S. Cl.
CPC ............ *G11C 7/1012* (2013.01); *G06F 17/16* (2013.01); *G11C 7/1063* (2013.01); *G11C 7/109* (2013.01); *G11C 7/12* (2013.01); *G11C 7/16* (2013.01); *G11C 8/08* (2013.01)

(58) Field of Classification Search
CPC ....... G11C 7/1012; G11C 7/16; G11C 7/1063; G11C 7/109; G11C 7/12; G11C 8/08
See application file for complete search history.

(56) References Cited

U.S. PATENT DOCUMENTS

| | | | |
|---|---|---|---|
| 8,275,727 B2 | 9/2012 | Elmegreen et al. | |
| 9,466,362 B2* | 10/2016 | Yu | G11C 13/0069 |
| 9,715,655 B2* | 7/2017 | Wu | G06N 3/044 |
| 10,643,705 B2 | 5/2020 | Choi et al. | |
| 2018/0075339 A1 | 3/2018 | Ma et al. | |
| 2020/0411091 A1 | 12/2020 | Hwang | |

OTHER PUBLICATIONS

Agarwal et al. "Achieving Ideal Accuracies in Analog Neuromorphic Computing Using Periodic Carry", 2017 Symposium on VLSI Technology, Jun. 2017, 2 pages.

(Continued)

*Primary Examiner* — Vanthu T Nguyen
(74) *Attorney, Agent, or Firm* — Kimberly Zillig; Otterstedt & Kammer PLLC (57) ABSTRACT

A plurality of bit lines corresponding to elements of an input vector intersect a plurality of word lines and a plurality of memristive cells are located at the intersections. At least three cells are grouped together to represent a single matrix element. At least three word lines correspond to each element of an output vector. An A/D converter is coupled to each of the word lines, and for each line, except a first, in each group, a shifter has an input coupled to one of the A/D converters. For each group, an addition-subtraction block adds the output of the A/D converter coupled to the first one of the word lines to outputs of each of the shifters except that for a last one of the word lines, subtracts the output of the last shifter, and outputs a corresponding element of an output vector.

20 Claims, 3 Drawing Sheets

(56) References Cited

OTHER PUBLICATIONS

Ambrogio et al. Unveiling Analog Memory-based Technologies to Advance AI at Vlsi, IBM Research Blog, Jun. 10, 2019, 9 pages, Retrieved Jul. 6, 2021, from www.ibm.com/blogs/research/2019/06/analog-ai-vlsi/.

Ambrogio et al. Inference of Deep Neural Networks with Analog Memory Devices, 2020 International Symposium on VLSI Technology, Systems and Applications, Aug. 2020, pp. 119-120.

Gedrim-Jacobs et al. "Analog high resistance bilayer RRAM device for hardware acceleration of neuromorphic computation", Journal of Applied Physics, Nov. 27, 2018, 12 pages.

Hu et al. "Memristor-based analog computation and neural network classification with a dot product engine", Advanced Materials, Jan. 10, 2018, 30 pages, vol. 30, Issue No. 9.

Kau et al. "A stackable cross point phase change memory", 2009 IEEE International Electron Devices Meeting (IEDM), Dec. 7-9, 2009, 4 pages.

Khaddam-Aljameh et al. "HERMES Core - A 14nm CMOS and PCM-based In-Memory Compute Core using an array of 300ps/LSB Linearized CCO-based ADCs and local digital processing", 2021 Symposium on VLSI Technology, Jun. 13-19, 2021, 2 pages.

Martemucci et al. "Accurate weight mapping in a multi-memristive synaptic unit", 2021 IEEE International Symposium on Circuits and Systems (ISCAS), May 22-28, 2021, 5 pages.

Nandakumar et al. "A phase-change memory model for neuromorphic computing", Journal of Applied Physics, Oct. 2018, 14 pages, vol. 124, Issue No. 15.

Valavi et al. "A 64-Tile 2.4-Mb In-Memory-Computing CNN Accelerator Employing Charge-Domain Compute", IEEE Journal of Solid-State Circuits, Jun. 2019, vol. 54, Issue: 6.

Yu et al. "Binary Neural Network with 16 Mb RRAM Macro Chip for Classification and Online Training", 2016 IEEE International Electron Devices Meeting (IEDM), Dec. 2016, 4 pages.

Zarcone et al. "Analog Coding in Emerging Memory Systems", Scientific reports, Apr. 22, 2020, 13 pages.

* cited by examiner

DIGITAL PHASE CHANGE MEMORY (PCM) ARRAY FOR ANALOG COMPUTING

BACKGROUND

The present invention relates to the electrical, electronic, and computer arts, and more specifically, to electronic circuitry suitable for neuromorphic computing and the like.

Phase change memory (PCM) is a viable technology for analog computing. PCM makes use of the properties of chalcogenide glass. Heat produced by the passage of an electric current through a heating element can quickly heat and quench the glass, making it amorphous, or hold it in its crystallization temperature range for some time, thereby switching it to a crystalline state.

Chalcogenide materials are an emerging class of commercial electronic materials that exhibit switching, memory, logic, and processing functionality. The basic principles of chalcogenide materials were developed in the 1960s and much effort since then has led to advancements of the underlying science and an expansion of the field of application of chalcogenide materials.

Some chalcogenide memory devices utilize the wide range of conductance values available for the active chalcogenide material as the basis of memory operations (i.e., to encode information). Each conductance value corresponds to a distinct structural state of the chalcogenide material, and one or more of the states can be selected and used to define operational memory states. For neuromorphic computing purposes, the accuracy and stability of the intermediate conductance states is important.

Chalcogenide materials, as noted, exhibit a crystalline state or phase as well as an amorphous state or phase. Different structural states of a chalcogenide material differ with respect to the relative proportions of crystalline and amorphous phase in a given volume or region of chalcogenide material. The range of conductance values is bounded by a SET state and a RESET state of the chalcogenide material. The SET state is a low resistance/high conductance structural state whose electrical properties are primarily controlled by the crystalline portion of the chalcogenide material and the RESET state is a high resistance/low conductance structural state whose electrical properties are primarily controlled by the amorphous portion of the chalcogenide material.

The memristor is a two-terminal active device that can change its resistance. Current challenges in the use of PCM for neuromorphic computing include unreliable bi-directionality (inability to partially decrease conductance/inability to have a negative conduction change), the nonlinear nature of the conductance update process, conductance drift, difficulty in retention of intermediate states, and programming and READ noise. Thus, while prior art techniques can use, for example, up to ten resistance values, they have not proven practical because of reliability issues due to resistance drift over time. This limits utility of prior art approaches for artificial intelligence (AI) matrix multiplications.

The paper *Inference of Deep Neural Networks with Analog Memory Devices*, by Stefano Ambrogio, Pritish Narayanan, Hsinyu Tsai, Charles Mackin, Katherine Spoon, An Chen, Andrea Fasoli, Alexander Friz, and Geoffrey W. Burr of the IBM Almaden Research Laboratory, in 2020 International Symposium on VLSI Technology, Systems and Applications (VLSI-TSA) 2020 Aug. 10 (pp. 119-120), IEEE (hereinafter, Ambrogio et al.), proposed the use of 4R (four memristor) PCM pairs, to mitigate the lack of negative conductance change and the nonlinear nature of the conductance update process (by using the difference in PCM conductances as the weight element). The use of additional PCMs has been proposed to reduce statistical error to address programming and read noise, in the paper *Accurate weight mapping in a multi-memristive synaptic unit*, by Michele Martemucci, Benedikt Kersting, Riduan Khaddam-Aljameh, Irem Boybat, S. R. Nandakumar, Urs Egger, Matthew Brightsky, Robert L. Bruce, Manuel Le Gallo, and Abu Sebastian of IBM Research, in 2021 IEEE International Symposium on Circuits and Systems (ISCAS) 2021 May 22 (pp. 1-5), IEEE.

SUMMARY

Principles of the invention provide techniques for digital phase change memory (PCM) array for analog computing. In one aspect, an exemplary electronic circuit for multiplying an input vector by a matrix to obtain an output vector includes a plurality of bit lines corresponding to elements of the input vector; a plurality of word lines intersecting the plurality of bit lines at a plurality of grid points; and a plurality of memristive cells located at the plurality of grid points. For each given one of the bit lines, groups of at least three of the memristive cells are grouped together so that each of the groups represents a single element in the matrix, and the word lines are grouped into corresponding groups of at least three word lines for each element of the output vector. An analog-to-digital converter is coupled to each of the word lines, and for each of the word lines, except a first one of the word lines, in each of the groups of at least three word lines, a shifter has an input coupled to a corresponding one of the analog-to-digital converters and has an output. For each of the groups of at least three word lines, an addition-subtraction block is configured to add the output of the analog-to-digital converter coupled to the first one of the word lines to the outputs of each of the shifters except for the shifter for a last one of the word lines, to subtract the output of the shifter for the last one of the word lines, and to output a result as a corresponding element of the output vector.

In another aspect, a hardware description language (HDL) design structure is encoded on a machine-readable data storage medium, and the HDL design structure includes elements that when processed in a computer-aided design system generates a machine-executable representation of an electronic circuit for multiplying an input vector by a matrix to obtain an output vector. The HDL design structure includes an electronic circuit for multiplying an input vector by a matrix to obtain an output vector as just described.

In still another aspect, an exemplary method of operating an electronic circuit for multiplying an input vector by a matrix to obtain an output vector includes providing the electronic circuit as just described; applying signals corresponding to the elements of the input vector to corresponding ones of the plurality of bit lines; converting analog current values for each of the word lines to corresponding digital values with the analog-to-digital converters; shifting the inputs of the shifters to corresponding shifted values output at the outputs of the shifters; and, for each of the groups of word lines, with a corresponding one of the adders, adding the output of the analog-to-digital converter coupled to the first one of the word lines to the outputs of each of the shifters except for the shifter for a last one of the word lines, and subtracting the output of the shifter for the last one of the word lines. The method further includes outputting results for each of the groups of n word lines as corresponding elements of the output vector.

As used herein, "facilitating" an action includes performing the action, making the action easier, helping to carry the action out, or causing the action to be performed. Thus, by way of example and not limitation, instructions executing on one processor might facilitate an action carried out by semiconductor fabrication equipment, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in hardware such as digital circuitry. This digital circuitry can then be used in a computer to train/execute machine learning software in a computationally efficient manner. The machine learning software can be implemented in the form of a computer program product including a computer readable storage medium with computer usable program code for performing the method steps indicated. The software can then be executed on a system (or apparatus) including a memory, and at least one processor that is coupled to the memory and operative to perform exemplary machine learning training and inference; the processor can be configured as described herein.

Techniques of the present invention can provide substantial beneficial technical effects. Some embodiments may not have these potential advantages and these potential advantages are not necessarily required of all embodiments. For example, one or more embodiments provide:

- ability to have a negative conduction change;
- ability for nonlinear conductance update;
- reduce or eliminate conductance drift;
- use of PCM elements in binary fashion with no need to retain intermediate states, thus mitigating accuracy and/or resistance stability issues associated with intermediate states;
- reduce programming and READ noise;
- more symmetric curve;
- compatibility with current analog computing array arrangements, with changes only needed in the peripheral circuitry;
- superior accuracy with similar speed as compared to prior art; and/or
- broad usability in artificial intelligence (AI) computing circuits.

These and other features and advantages of the present invention will become apparent from the following detailed description of illustrative embodiments thereof, which is to be read in connection with the accompanying drawings.

DETAILED DESCRIPTION

One or more embodiments advantageously reduce or eliminate the issues with the prior art as discussed above. One or more embodiments employ PCM as a binary bit for neuromorphic computing, with weights from $-2^{n-1}$ to $2^{n-1}-1$, where n is the number of PCM pairs used for a single weight. The current 4R PCM configuration used in the paper *HERMES Core—A 14 nm CMOS and PCM-based In-Memory Compute Core using an array of 300 ps/LSB Linearized CCO-based ADCs and local digital processing*, by Khaddam-Aljameh R., Stanisavljevic M., Mas J F, Karunaratne G., Braendli M., Liu F., Singh A., Müller S M, Egger U., Petropoulos A., and Antonakopoulos T., of IBM and University of Patras, Greece, in 2021 Symposium on VLSI Circuits 2021 Jun. 13 (pp. 1-2), IEEE, can achieve the same as 4-bit digital reduced precision accuracy for training data sets to test accuracy of system.

Figure 1:
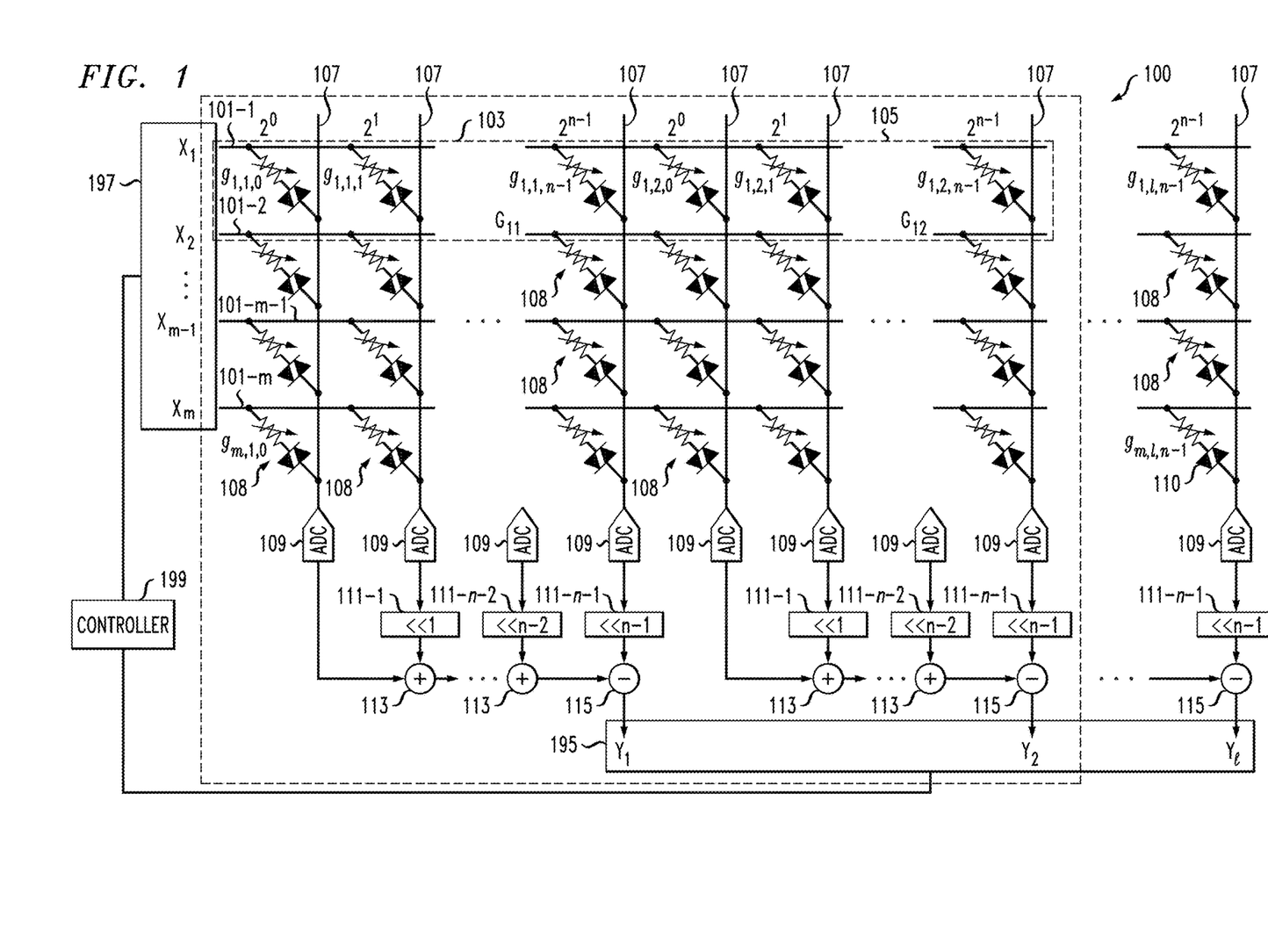
FIG. 1 shows an exemplary electronic circuit for multiplying an input vector by a matrix to obtain an output vector, according to an aspect of the invention.

FIG. 1 shows an exemplary circuit 100, according to an aspect of the invention. The circuit carries out the multiplication:

$$Y = GX$$

In the above, Y is a 1×l vector, G is an m×l matrix, and X is an m×1 vector. Each weight (conductance) $G_{i,j}$ is digitized by n MEM resistors (memristors):

$$G_{i,j} = \sum_{k=0}^{n-2} 2^k g_{i,j,k} - 2^{n-1} g_{i,j,n-1} \qquad (1)$$

In the above, n is the number of bits. Values from $-2^{n-1}$ to $2^{n-1}-1$ are covered.

In one or more embodiments employing PCM, $g_{i,j,k}$ is either in full RESET, with a conductance value of less than 0.1 μS (micro Siemens), or full SET, with a conductance value of about 10 μS. It should be noted that if more than two states can accurately be achieved by the mem resistor (memristor), the circuit can be readily adapted to take advantage of the additional state(s). For example, in the more general case of a b state mem resistor (memristor), the equation is as follows:

$$G_{i,j} = \sum_{k=0}^{n-2} b^k g_{i,j,k} - b^{n-1} g_{i,j,n-1} \qquad (2)$$

In FIG. 1, the elements of the X vector, namely, $X_1$, $X_2, \ldots, X_{m-1}, X_m$ are input to the respective bit lines 101-1, 101-2, ..., 101-$m$−1, 101-$m$. The elements of the conductance/weight G matrix are $G_{11}$ labeled 103, $G_{12}$ labeled 105, and so on. Note the plurality of word lines 107. A memristive cell 108 (to avoid clutter, only a few of the cells are numbered in FIG. 1) is located at the intersection of each word line 107 with each bit line 101-1, 101-2, ..., 101-$m$−1, 101-$m$. Each cell 108 includes a memristive element symbolized by the variable resistance (not separately numbered) as well as a selector 110 (only one selector 110 is numbered to avoid clutter). Suitable selectors can employ diodes, access transistors, ovonic threshold switches (OTS), or the like. The skilled artisan will be familiar with memristors, selectors, peripheral circuitry, voltage supply, ground rails, and the like, and given the teachings herein, will be able to construct one or more embodiments. Each element of the conductance/weight G matrix is represented by n cells numbered $g_{1,1,0}, g_{1,1,1}, \ldots, g_{1,1,n-1}$, in the case of $G_{11}$, $g_{1,2,0}, g_{1,2,1}, \ldots, g_{1,2,n-1}$ in the case of $G_{12}$, and so on. As discussed further below, the $k^{th}$ storage unit of the n storage units represents the $2^{k-1}$ place. In FIG. 1, for $G_{11}$ labeled 103, $g_{1,1,0}$ corresponds to $2^0$ or ones (least significant bit), $g_{1,1,1}$ corresponds to $2^1$ or twos, ..., and $g_{1,1,n-1}$ corresponds to $2^{n-1}$ (most significant bit).

Thus, one or more embodiments employ digitization/quantization of states (e.g., a binary ON-OFF or somewhat larger number (e.g. 3 or 4) of stable states, which advantageously makes weight storage more stable/reliable. In one or more embodiments, the individual g values are individual memristive elements (e.g., PCM, RRAM) that can have HIGH or LOW resistance (as noted, three or more states are also possible if they can be reliably achieved). The non-volatile memory (NVM) is used as a computation device. Aspects of the invention include assembling sub-columns (g values) into overall column (G values). Note that "column" is used herein to refer to individual sub-columns (g) and the overall group of sub-columns summed/subtracted together (G) as the skilled artisan will appreciate from the context.

In operation, to obtain the elements of the output vector Y, the total current in each column is converted to a digital value by a corresponding analog-to-digital converter (ADC) 109. The skilled artisan will thus appreciate that the bit lines 101 can be used to program the PCM while the word lines 107 feed out to the ADCs. Operation of shifters 111-1, ..., 111-n−2, 111-n−1, adders 113, and subtractors 115 are discussed below.

Consider now aspects of error estimation. Assume that $g_{min}=0.1\pm0.2$ μS (ignore negative values of G), while $g_{max}=25\pm1.0$ μS. If the current conductance range is too high for binary operation, heavily doped GST can be used to shift the range to lower values, while maintaining a similar dynamic range (GeSbTe (germanium-antimony-tellurium or GST) is a phase-change material from the group of chalcogenide glasses used in rewritable optical discs and phase-change memory applications). Note also that memristors employed in one or more embodiments are not limited to PCM. Non-limiting examples include electrochemical RAM (ECRAM), resistive RAM (RRAM), or conductive bridge (CBRAM) (also known as programmable metallization cell (PMC)). Other possibilities include FeRAM (ferroelectric RAM) and MRAM (magnetic RAM, which operates in a binary fashion and can potentially be used).

Assume, for a specific column 107, that there are z PCMs at conductance $g_{min}$, and m-z PCMs at conductance $g_{max}$. For that specific column:

$$Y = \sum_{i=1}^{z} X_i g_{mini} + \sum_{i=z+1}^{m} X_i g_{maxi},$$

$$E(Y) = 0.1 \sum_{i=1}^{z} X_i + 25 \sum_{i=z+1}^{m} X_i,$$

$$\sigma(Y) = \left(0.04 \sum_{i=1}^{z} X_i^2 + \sum_{i=z+1}^{m} X_i^2\right)^{1/2}$$

Some error comes from the accumulation of non-zero $g_{min}$, which is also the case in the prior art; this can be offset by setting a threshold in the column ADC 109. Some error comes from conductance variations; this error will be averaged out, and is proportional to $1/(m)^{1/2}$.

One or more embodiments thus provide a non-volatile memory circuit 100, including an array of storage units 108 connected along a plurality of bit lines 101-1, 101-2, ..., 101-m−1, 101-m. Each storage unit 108 is configured to store one bit of information. To form a single weight (i.e., a single element of the weight matrix such as $G_{11}$ 103 or $G_{12}$ 105), n storage units 108 are taken together. The $k^{th}$ storage unit of the n storage units represents the $2^{k-1}$ place. So, for $G_{11}$ labeled 103, $g_{1,1,0}$ corresponds to $2^{1-1}$ or $2^0$ or ones (least significant bit), $g_{1,1,1}$, corresponds to $2^{2-1}$ or $2^1$ or twos, ..., and $g_{1,1,n-1}$ corresponds to $2^{n-1}$ (most significant bit, k=n). A multi-bit ADC converter 109 is connected to each column output to convert the current output to a digital signal. A shifter 111-1, ..., 111-n−2, 111-n−1 is connected to each ADC output (except the first column for a given entry in the weight matrix) to shift the digital signal by $2^{k-1}$. The bit shifters for each column output are used in one or more embodiments for further digital operation. Digital adders and a digital subtractor are respectively used for every n columns to sum the input from columns 1 to n−1 (or 0 to n−2) and to subtract the $n^{th}$ column (or n−$1^{th}$ column). Each group of n columns 0 ... n−1 (or 1 ... n) has multiple adders 113 and a subtractor 115. The digital adders sum the input from columns 1 to n−1 (or 0 to n−2) and the subtractor 115 subtracts the $n^{th}$ (or n−$1^{th}$) column; the output of subtractor 115 is the corresponding element in the Y vector, i.e., $Y_1, Y_2, ..., Y_j$. The skilled artisan can choose what indices to employ; e.g., 1 to n or 0 to n−1. A single sign bit is used in one or more embodiments to map the weight to the negative region.

It is worth noting that in one or more embodiments, the array of G elements is at least two by two; i.e., at least $G_{11}$, $G_{12}$, $G_{21}$, and $G_{22}$. Furthermore, in one or more embodiments, an element $G_{11}, G_{12}$ and so on includes at least 3 cells $(g_{1,1,0}, g_{1,1,1}, g_{1,1,2}), (g_{1,2,0}, g_{1,2,1}, g_{1,2,2})$ and so on, with the first two or more weights being positive and the final weight/sub-column being negative. This latter weight is the last sub-column with the subtractor 115, which permits a negative weight. For example, suppose zero is stored in the last memory unit; then, the weights will all be positive, since shifting zero by minus one with shifter 111-n−1 will still be zero. However, suppose one is stored in the last memory unit. It can be a very negative large value when shifted. This is a pertinent aspect of one or more embodiments—use of potentially many additions and only one subtraction. This permits covering an overall range of weights for a given G from $-2^{n-1}$ to $2^{n-1}-1$, where n is the number of PCM pairs used for a single weight, as discussed above. This, in one or more embodiments, each sub-column except the last feeds an adder 113 while the last sub-column feeds a subtractor 115. Note that one input to the rightmost of the adders 113 is from a shifter 111-n−2 that shifts <<n−2 and not <<n−1. Adding shift one (<<1) all the way to shift n minus 2 (<<n−2) closely approaches $2^{n-1}$—there is only a difference of one. The last sub-column with the subtractor 115 permits a negative weight.

The skilled artisan will be familiar with the construction of shifters that shift by a desired number of bits, using stages of flip-flops or the like. The skilled artisan will be familiar with the construction of adders and subtractors using AND gates, OR gates, exclusive OR gates, inverters, NAND gates, and the like.

One or more embodiments carry out analog-to-digital conversion for each sub-column prior to the addition, to reduce analogy error and improve accuracy. One or more embodiments use a sign column for negative weights (i.e., the single sub-column connected to the subtractor 115, to flip the sign), advantageously reducing the number of memory bits used as compared to prior-art techniques that have multiple columns of negative signs to do subtraction bit-by-bit. Although it is possible to use the elements 108 using more than two states, one or more embodiments advantageously use each element 108 in a purely binary mode, to mitigate accuracy and resistance stability issues related to intermediate states.

Furthermore, one or more embodiments use a binary resistive memory array for analog computing, which is significantly faster and more energy efficient than digital computing.

Thus, one or more embodiments advantageously employ an additional bit shifter to quickly add up the weights from different columns.

One or more embodiments employ current-domain computation relying on conductance of the individual memory cells 108. One or more embodiments use resistive memory which is non-volatile, occupies less footprint than static random access memory (SRAM), and consumes less energy. One or more embodiments employ the positional number system. For example, a number of prior art techniques do not use the positional number system for digital weight; instead, they employ the memristor as a continuous analog weight. In contrast, one or more embodiments employ digital weights with the positional number system, which greatly mitigates the non-ideality that is inherent with analog weights, such as conductance drift, nonlinear conductance update, retention, noise, and the like.

Once the weights are stored in the array, inference can be performed. Non-limiting examples of inference include handwriting recognition, such as recognition of hand-written digits; classification of images; and natural language processing. Furthermore with regard to storing weights, see discussion elsewhere herein re pulse units for programming the cells with weights by causing changes in states of the phase change material.

The skilled artisan will be familiar with the construction of prior-art memory arrays and, given the teachings herein, can implement suitable word lines, bit lines, access devices, adders, subtractors (and any other appropriate or desired circuits or circuit elements such as integrators, operational amplifiers, capacitors, transistors, and the like) using known techniques.

Given the discussion thus far, it will be appreciated that, in general terms, an exemplary electronic circuit for multiplying an input vector (e.g., X) by a matrix (e.g., G) to obtain an output vector (e.g., Y), according to an aspect of the invention, includes a plurality of bit lines 101 corresponding to (e.g., first through $m^{th}$) elements of the input vector; a plurality of word lines 107 intersecting the plurality of bit lines at a plurality of grid points; and a plurality of memristive cells 108 located at the plurality of grid points. For each given one of the bit lines, groups of at least three (typically designated as n) of the memristive cells are grouped together so that each of the groups represents a single element in the matrix. the word lines are grouped into corresponding groups of at least three (typically designated as n) word lines for each element of the output vector. Also included is an analog-to-digital converter 109 coupled to each of the word lines. For each of the word lines, except a first one of the word lines, in each of the groups of at least three word lines, a shifter 111-1, . . . , 111-$n$-2, 111-$n$-1 is provided, having an input coupled to a corresponding one of the analog-to-digital converters and having an output. For each of the groups of at least three word lines, an addition-subtraction block (example discussed further below) is configured to add the output of the analog-to-digital converter coupled to the first one of the word lines to the outputs of each of the shifters except for the shifter for the last one of the word lines, to subtract the output of the shifter for the last one of the word lines, and to output a result as a corresponding element of the output vector.

A number of different techniques to implement suitable analog-to-digital converters will be apparent to the skilled person, given the teachings herein. For example, one way is to employ multiple comparator converters in which comparators are used to detect different voltage levels and output their switching state to an encoder. Such converters typically use a series of interconnected but equally spaced comparators and voltage references generated by a series network of precision resistors for generating an equivalent output code for a particular resolution. In one or more embodiments using 2-state cells (b=2), since shifting occurs after the ADC, the claimed analog-to-digital converter can be implemented, for example, by a single bit comparator and then the shifter.

One or more embodiments employ two-state cells, such that a first, non-zero fraction of the memristive cells are in a full SET state and a remaining (i.e. the two fractions add up to 100%), second, non-zero fraction of the memristive cells are in a full RESET state. Thus, in some instances, the groups of at least three of the memristive cells include n of the memristive cells, and a given one of the shifters 111-1 for a second one of the word lines shifts leftward by one bit, a given one of the shifters 111-$n$-2 for a penultimate one of the word lines shifts leftward by n−2 bits, and a given one of the shifters 111-$n$-1 for a rightmost one of the word lines shifts leftward by n−1 bits. Each successive shifter moving from left to right shifts leftward by one additional bit. Leftward and rightward refer to bit places and do not necessarily imply location in a physical circuit embodying aspects of the invention. The skilled person, given the teachings herein, can construct appropriate shifters for any value of n and for any number of stable states.

Furthermore in this regard, if the memory cells are binary, after the ADC the result is a zero or a one (if 3 or more stable states, then after the ADC a corresponding higher number of results are possible). Shifting of the output of the ADC is carried out in one or more embodiments. Depending on which word line, the shift will be by a different amount of bits. If $G_{11}$ has 8 cells inside, for example, this value could be 7 or 6. It depends on how many weights it is desired to store in $G_{11}$. Thus, for an example of n=8 and two states, the left-most ADC output can be zero or one. The second left-most ADC output is shifted to the left by 1 bit. The output after this ADC is again 0 or 1 but it is shifted it by 1 bit to the left. So a zero is shifted to binary 00 or a one is shifted to binary 10. The third left-most ADC is shifted to the left by 2 bits, so if the ADC outputs a one it is shifted left by 2 bits and binary 100 is obtained. When you add them all together . . . each shifter shifts by a different amount. The next to last ADC shifts by 6 bits and the last ADC shifts by 7 bits and has a minus sign to represent a negative weight.

In one or more embodiments, the first, non-zero fraction of the memristive cells in the full SET state and the remaining, second, non-zero fraction of the memristive cells in the full RESET state encode corresponding weights of a neural network according to equation (1); i is a row index for rows corresponding to rows of the matrix G and the bit lines; j is a column index for columns corresponding to columns of the matrix G and the groups of n word lines; k is a counting index; and g is a conductance of a corresponding one of the memristive cells.

One or more embodiments include appropriate peripheral circuitry 197, 195 and a suitable controller 199, for input/output, programming with weights, inferencing with the programmed array, and so on. The peripheral circuitry can include pulse units for programming, an input vector (e.g., input voltage vector) peripheral circuit to input the X vector for inferencing, an output buffer or the like to hold the Y vector, and the like. Given the teachings herein, the skilled artisan will be able to provide any additional desired/required peripheral circuitry, voltage supply, elements to interface with peripheral circuitry, and a controller by adapting known techniques, e.g., integrators based on an op-amp and capacitor, digital logic circuitry, field-programmable gate array (FPGA) or application specific integrated circuit (ASIC) or specific macro on a memory chip, and the like. One or more embodiments this include an input vector peripheral circuit (e.g., 197) coupled to the plurality of word lines; and a control circuit 199 configured to control the input vector peripheral circuit to carry out inferencing with the plurality of memristive cells having the neural network weights stored therein.

While one or more embodiments, as noted, employ binary states, in another aspect, three or more-state cells are employed, such that a first, non-zero fraction of the memristive cells are in a full SET state, a second, non-zero fraction of the memristive cells are in a full RESET state, and a remaining, third, non-zero fraction of the memristive cells are in at least one intermediate state.

In one or more embodiments, the first, non-zero fraction of the memristive cells in the full SET state, the second, non-zero fraction of the memristive cells in the full RESET state, and the remaining, third, non-zero fraction of the memristive cells in the at least one intermediate state encode corresponding weights of a neural network according to equation (2), wherein i is a row index for rows corresponding to rows of the matrix G and the bit lines; j is a column index for columns corresponding to columns of the matrix G and the groups of n word lines; k is a counting index; g is a conductance of a corresponding one of the memristive cells; and b is a number, at least three, corresponding to a total of the full SET state, the full RESET state, and the at least one intermediate state.

In one or more embodiments, the addition-subtraction block for each of the groups of n word lines includes n−1 adders configured to add the output of the analog-to-digital converter coupled to the first one of the word lines to the outputs of each of the shifters except for the shifter for the last one of the word lines; and a subtractor configured to subtract the output of the shifter for the last one of the word lines, and to output a result as a corresponding element of the output vector. One or more embodiments advantageously only include one subtractor for each group of sub-columns in an overall column.

In another aspect, an exemplary method of operating an electronic circuit for multiplying an input vector by a matrix to obtain an output vector, of the kind described, includes providing the electronic circuit; applying signals (e.g., voltages) corresponding to the elements of the input vector X to corresponding ones of the plurality of bit lines; converting analog current values for each of the word lines to corresponding digital values with the analog-to-digital converters 109; shifting the inputs of the shifters 111-1, . . . , **111-*n*−2, 111-*n*−1 to corresponding shifted values output at the outputs of the shifters; and, for each of the groups of word lines, with a corresponding one of the adders, adding the output of the analog-to-digital converter coupled to the first one of the word lines to the outputs of each of the shifters except for the shifter for a last one of the word lines, and subtracting the output of the shifter for the last one of the word lines. A further step includes outputting results for each of the groups of n word lines as corresponding elements of the output vector Y (e.g., into an output buffer represented by 195**).

With regard to binary embodiments, one or more embodiments further include programming a first, non-zero fraction of the memristive cells to be in a full SET state and a remaining, second, non-zero fraction of the memristive cells to be in a full RESET state.

In one or more instances, the groups of at least three of the memristive cells include n of the memristive cells, and the shifting includes: for a given one of the shifters 111-1, for a second one of the word lines, shifting leftward by one bit; for a given one of the shifters **111-*n*−2 for a penultimate one of the word lines, shifting leftward by n−2 bits; and, for a given one of the shifters 111-*n*−1** for a rightmost one of the word lines, shifting leftward by n−1 bits. In one or more embodiments, the matrix is designated as G and the groups of word lines include n of the word lines; and the programming of the first, non-zero fraction of the memristive cells to be in the full SET state and the remaining, second, non-zero fraction of the memristive cells to be in the full RESET state includes encoding the cells with corresponding weights of a neural network according to equation (1) as discussed elsewhere herein.

With regard to embodiments with three or more states, one or more embodiments further include programming a first, non-zero fraction of the memristive cells to be in a full SET state, a second, non-zero fraction of the memristive cells to be in a full RESET state, and a remaining, third, non-zero fraction of the memristive cells to be in at least one intermediate state. In one or more embodiments, the matrix is designated as G and the groups of word lines include n of the word lines; and the programming of the first, non-zero fraction of the memristive cells to be in the full SET state, the second, non-zero fraction of the memristive cells to be in the full RESET state, and the remaining, third, non-zero fraction of the memristive cells to be in the at least one intermediate state includes encoding the cells with corresponding weights of a neural network according to equation (2) as discussed elsewhere herein.

Given the teachings herein, the skilled artisan can implement the circuits herein using known integrated circuit fabrication techniques.

Figure 2:
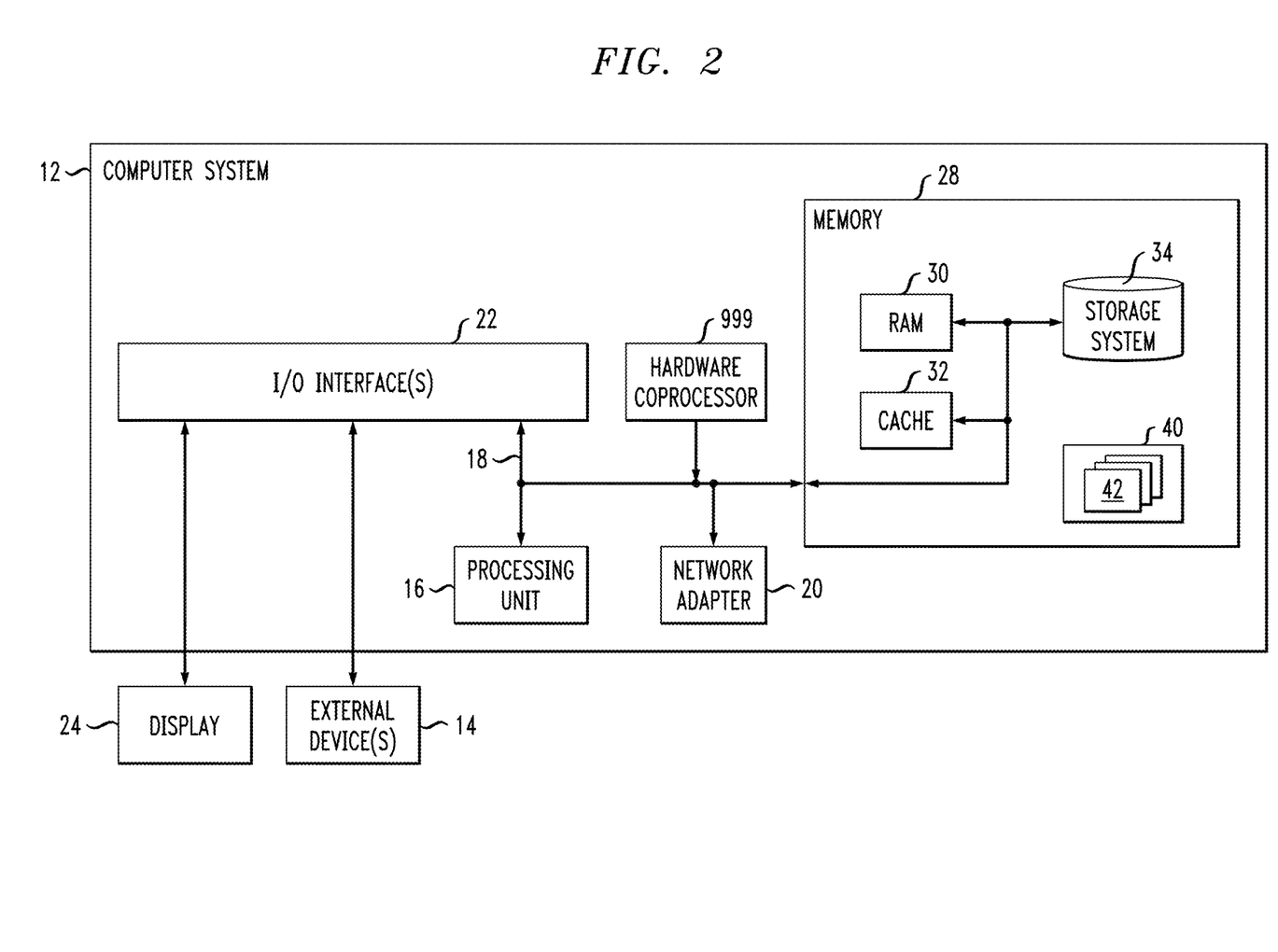
FIG. 2 depicts a computer system that uses a coprocessor in accordance with aspects of the invention, suitable for accelerating neural network implementation and the like (also representative of a general-purpose computer that could implement a design process such as that shown in FIG. 3)

Referring to FIG. 2, some aspects of the invention can be implemented as a hardware coprocessor 999 that uses the specialized hardware computation in memory techniques disclosed herein to accelerate inferencing for neural networks or the like. FIG. 2 depicts a computer system 12 including such a hardware coprocessor. Computer system 12 includes, for example, one or more conventional processors or processing units 16, a system memory 28, and a bus 18 that couples various system components including system memory 28 and one or more hardware coprocessors 999 to processor 16. The elements 999 and 16 can connect to the bus, for example, with suitable bus interface units.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below memory 28 may include at least one program product having a set (e.g., at least one) of program modules that are configured to carry out, e.g., software-implemented portions of a neural network and/or aspects of computer-aided semiconductor design, manufacture, and test as discussed herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out software-implemented functions and/or methodologies.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Still with reference to FIG. 2, note processor 16, memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry (e.g., 999). Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, coprocessor 999, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing desired tasks, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 2) running a server program. It will be understood that such a physical server may or may not include a display and keyboard. Furthermore, FIG. 2 is also representative of a conventional general-purpose computer (e.g., without co-processor 999) that could be used, for example, to implement aspects of the design process described below.

Exemplary Design Process Used in Semiconductor Design, Manufacture, and/or Test

Figure 3:
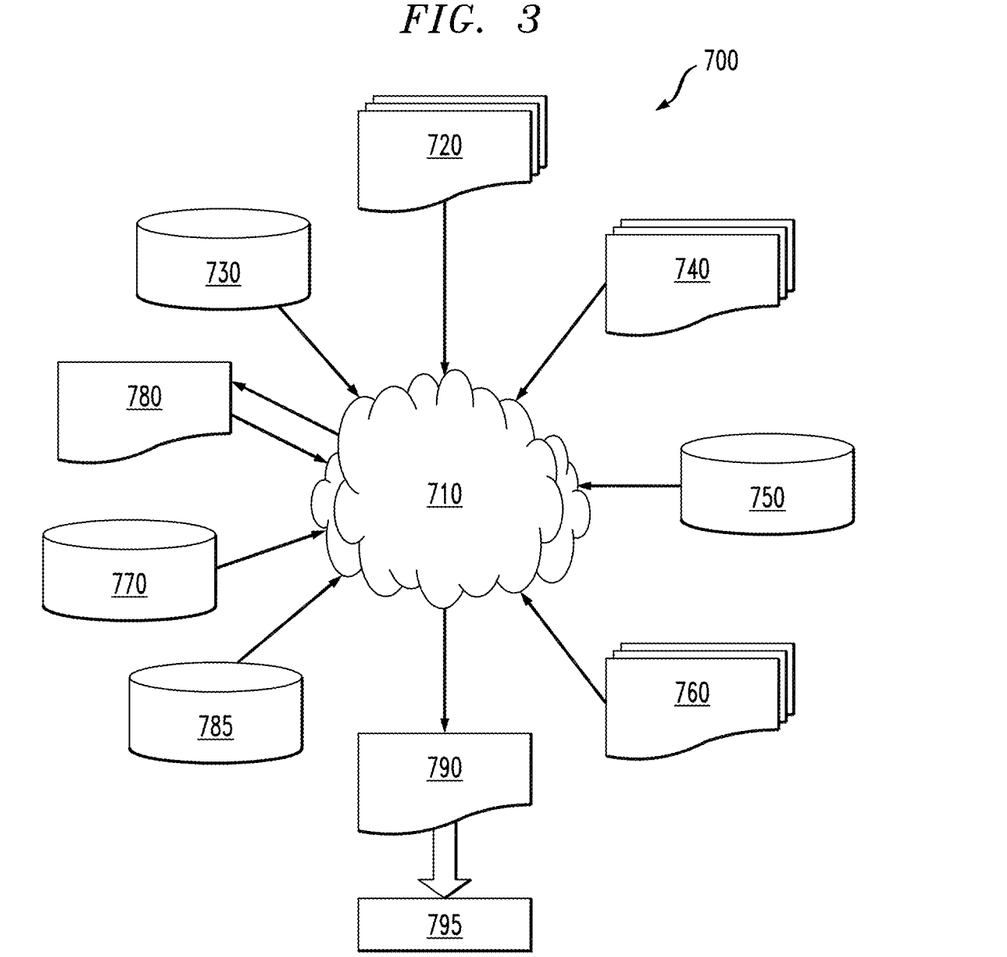
FIG. 3 is a flow diagram of a design process used in semiconductor design, manufacture, and/or test.

One or more embodiments of hardware in accordance with aspects of the invention can be implemented using techniques for semiconductor integrated circuit design simulation, test, layout, and/or manufacture. In this regard, FIG. 3 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those disclosed herein or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g., e-beam writers), computers or equipment for simulating design structures, any apparatus used in the manufacturing or test process, or any machines for programming functionally equivalent representations of the design structures into any medium (e.g., a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 3 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher-level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g., information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like as disclosed herein. In one embodiment, design structure 790 may comprise a compiled, executable HDL simulation model that functionally simulates the devices disclosed herein.

Design structure 790 may also employ a data format used for the exchange of layout data of integrated circuits and/or symbolic data format (e.g., information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein. Design structure 790 may then proceed to a stage 795 where, for example, design structure 790: proceeds to tape-out, is released to manufacturing, is released to a mask house, is sent to another design house, is sent back to the customer, etc.

With regard to design structures as discussed herein, it will be appreciated that unlike a physical embodiments of a circuit, the design structure that embodies the circuit for manufacturing purposes does not actually store data; however, the plurality of memristive cells defined by the design structure are configured, when manufactured and manifested physically, for binary information storage (for example, a first, non-zero fraction of the memristive cells can be programmed in a full SET state and a remaining, second, non-zero fraction of the memristive cells can be programmed in a full RESET state). Further, the design structure could include a representation of a controller that is or can be configured to cause the first, non-zero fraction of the memristive cells to be programmed in the full SET state and the remaining, second, non-zero fraction of the memristive cells to be programmed in the full RESET state so as to encode corresponding weights of a neural network according to equation (1), for example.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An electronic circuit for multiplying an input vector by a matrix to obtain an output vector, the electronic circuit comprising:
    a plurality of bit lines corresponding to elements of said input vector;
    a plurality of word lines intersecting said plurality of bit lines at a plurality of grid points;
    a plurality of memristive cells located at said plurality of grid points, wherein, for each given one of said bit lines, groups of at least three of said memristive cells are grouped together so that each of said groups represents a single element in the matrix, and wherein said word lines are grouped into corresponding groups of at least three word lines for each element of said output vector;
    an analog-to-digital converter coupled to each of said word lines;
    for each of said word lines, except a first one of said word lines, in each of said groups of at least three word lines, a shifter having an input coupled to a corresponding one of said analog-to-digital converters and having an output;
    for each of said groups of at least three word lines, an addition-subtraction block configured to add said output of said analog-to-digital converter coupled to said first one of said word lines to said outputs of each of said shifters except for said shifter for a last one of said word lines, to subtract said output of said shifter for said last one of said word lines, and to output a result as a corresponding element of said output vector.

2. The electronic circuit of claim 1, wherein a first, non-zero fraction of said memristive cells are in a full SET state and a remaining, second, non-zero fraction of said memristive cells are in a full RESET state.

3. The electronic circuit of claim 2, wherein said groups of at least three of said memristive cells comprise n of said memristive cells, and wherein a given one of said shifters for a second one of said word lines shifts leftward by one bit, a given one of said shifters for a penultimate one of said word lines shifts leftward by n−2 bits, and a given one of said shifters for a rightmost one of said word lines shifts leftward by n−1 bits.

4. The electronic circuit of claim 3, wherein:
    said matrix is designated as G and said groups of word lines comprise n of said word lines; and
    said first, non-zero fraction of said memristive cells in said full SET state and said remaining, second, non-zero fraction of said memristive cells in said full RESET state encode corresponding weights of a neural network according to:

$$G_{i,j} = \sum_{k=0}^{n-2} 2^k g_{i,j,k} - 2^{n-1} g_{i,j,n-1};$$

wherein:
    i is a row index for rows corresponding to rows of said matrix G and said bit lines;
    j is a column index for columns corresponding to columns of said matrix G and said groups of n word lines;
    k is a counting index; and
    g is a conductance of a corresponding one of said memristive cells.

5. The electronic circuit of claim 4, further comprising:
    an input vector peripheral circuit coupled to the plurality of word lines; and
    a control circuit configured to control said input vector peripheral circuit to carry out inferencing with said plurality of memristive cells having said neural network weights stored therein.

6. The electronic circuit of claim 1, wherein a first, non-zero fraction of said memristive cells are in a full SET state, a second, non-zero fraction of said memristive cells are in a full RESET state, and a remaining, third, non-zero fraction of said memristive cells are in at least one intermediate state.

7. The electronic circuit of claim 6, wherein:
    said matrix is designated as G and said groups of word lines comprise n of said word lines; and
    said first, non-zero fraction of said memristive cells in said full SET state, said second, non-zero fraction of said memristive cells in said full RESET state, and said remaining, third, non-zero fraction of said memristive cells in said at least one intermediate state encode corresponding weights of a neural network according to:

$$G_{i,j} = \sum_{k=0}^{n-2} b^k g_{i,j,k} - b^{n-1} g_{i,j,n-1};$$

wherein:
    i is a row index for rows corresponding to rows of said matrix G and said bit lines;
    j is a column index for columns corresponding to columns of said matrix G and said groups of n word lines;
    k is a counting index;
    g is a conductance of a corresponding one of said memristive cells; and
    b is a number, at least three, corresponding to a total of said full SET state, said full RESET state, and said at least one intermediate state.

8. The electronic circuit of claim 1, wherein said groups of word lines comprise n of said word lines and said addition-subtraction block for each of said groups of n word lines comprises:

n−1 adders configured to add said output of said analog-to-digital converter coupled to said first one of said word lines to said outputs of each of said shifters except for said shifter for said last one of said word lines; and a subtractor configured to subtract said output of said shifter for said last one of said word lines, and to output a result as a corresponding element of said output vector.

9. A method of operating an electronic circuit for multiplying an input vector by a matrix to obtain an output vector, the method comprising:

providing said electronic circuit, said electronic circuit comprising:

a plurality of bit lines corresponding to elements of said input vector;

a plurality of word lines intersecting said plurality of bit lines at a plurality of grid points;

a plurality of memristive cells located at said plurality of grid points, wherein, for each given one of said bit lines, groups of at least three of said memristive cells are grouped together so that each of said groups represents a single element in the matrix, and wherein said word lines are grouped into corresponding groups of at least three word lines for each element of said output vector;

an analog-to-digital converter coupled to each of said word lines;

for each of said word lines, except a first one of said word lines, in each of said groups of at least three word lines, a shifter having an input coupled to a corresponding one of said analog-to-digital converters and having an output;

for each of said groups of at least three word lines, an addition-subtraction block configured to add said output of said analog-to-digital converter coupled to said first one of said word lines to said outputs of each of said shifters except for said shifter for a last one of said word lines, to subtract said output of said shifter for said last one of said word lines, and to output a result as a corresponding element of said output vector;

applying signals corresponding to said elements of said input vector to corresponding ones of said plurality of bit lines;

converting analog current values for each of said word lines to corresponding digital values with said analog-to-digital converters;

shifting said inputs of said shifters to corresponding shifted values output at said outputs of said shifters;

for each of said groups of word lines, with a corresponding one of said adders, adding said output of said analog-to-digital converter coupled to said first one of said word lines to said outputs of each of said shifters except for said shifter for a last one of said word lines, and subtracting said output of said shifter for said last one of said word lines; and outputting results for each of said groups of n word lines as corresponding elements of said output vector.

10. The method of claim 9, further comprising programming a first, non-zero fraction of said memristive cells to be in a full SET state and a remaining, second, non-zero fraction of said memristive cells to be in a full RESET state.

11. The method of claim 10, wherein said groups of at least three of said memristive cells comprise n of said memristive cells, and wherein said shifting comprises:

for a given one of said shifters for a second one of said word lines, shifting leftward by one bit;

for a given one of said shifters for a penultimate one of said word lines, shifting shifts leftward by n−2 bits; and for a given one of said shifters for a rightmost one of said word lines, shifting leftward by n−1 bits.

12. The electronic circuit of claim 11, wherein:

said matrix is designated as G and said groups of word lines comprise n of said word lines; and said programming of said first, non-zero fraction of said memristive cells to be in said full SET state and said remaining, second, non-zero fraction of said memristive cells to be in said full RESET state comprises encoding said cells with corresponding weights of a neural network according to:

$$G_{i,j} = \sum_{k=0}^{n-2} 2^k g_{i,j,k} - 2^{n-1} g_{i,j,n-1};$$

wherein:

i is a row index for rows corresponding to rows of said matrix G and said bit lines;

j is a column index for columns corresponding to columns of said matrix G and said groups of n word lines;

k is a counting index; and g is a conductance of a corresponding one of said memristive cells.

13. The method of claim 9, further comprising programming a first, non-zero fraction of said memristive cells to be in a full SET state, a second, non-zero fraction of said memristive cells to be in a full RESET state, and a remaining, third, non-zero fraction of said memristive cells to be in at least one intermediate state.

14. The method of claim 13, wherein:

said matrix is designated as G and said groups of word lines comprise n of said word lines; and said programming of said first, non-zero fraction of said memristive cells to be in said full SET state, said second, non-zero fraction of said memristive cells to be in said full RESET state, and said remaining, third, non-zero fraction of said memristive cells to be in said at least one intermediate state comprises encoding said cells with corresponding weights of a neural network according to:

$$G_{i,j} = \sum_{k=0}^{n-2} b^k g_{i,j,k} - b^{n-1} g_{i,j,n-1};$$

wherein:

i is a row index for rows corresponding to rows of said matrix G and said bit lines;

j is a column index for columns corresponding to columns of said matrix G and said groups of n word lines;

k is a counting index;

g is a conductance of a corresponding one of said memristive cells; and b is a number, at least three, corresponding to a total of said full SET state, said full RESET state, and said at least one intermediate state.

15. A hardware description language (HDL) design structure encoded on a machine-readable data storage medium, said HDL design structure comprising elements that when processed in a computer-aided design system generates a machine-executable representation of an electronic circuit for multiplying an input vector by a matrix to obtain an output vector, wherein said HDL design structure comprises:

a plurality of bit lines corresponding to elements of said input vector;

a plurality of word lines intersecting said plurality of bit lines at a plurality of grid points;

a plurality of memristive cells located at said plurality of grid points, wherein, for each given one of said bit lines, groups of at least three of said memristive cells are grouped together so that each of said groups represents a single element in the matrix, and wherein said word lines are grouped into corresponding groups of at least three word lines for each element of said output vector;

an analog-to-digital converter coupled to each of said word lines;

for each of said word lines, except a first one of said word lines, in each of said groups of at least three word lines, a shifter having an input coupled to a corresponding one of said analog-to-digital converters and having an output;

for each of said groups of at least three word lines, an addition-subtraction block configured to add said output of said analog-to-digital converter coupled to said first one of said word lines to said outputs of each of said shifters except for said shifter for a last one of said word lines, to subtract said output of said shifter for said last one of said word lines, and to output a result as a corresponding element of said output vector.

16. The HDL design structure of claim 15, wherein said plurality of memristive cells are configured for binary information storage such that a first, non-zero fraction of said memristive cells can be programmed in a full SET state and a remaining, second, non-zero fraction of said memristive cells can be programmed in a full RESET state.

17. The HDL design structure of claim 16, wherein said groups of at least three of said memristive cells comprise n of said memristive cells, and wherein a given one of said shifters for a second one of said word lines shifts leftward by one bit, a given one of said shifters for a penultimate one of said word lines shifts leftward by n−2 bits, and a given one of said shifters for a rightmost one of said word lines shifts leftward by n−1 bits.

18. The HDL design structure of claim 17, further comprising a controller, wherein:

said matrix is designated as G and said groups of word lines comprise n of said word lines; and said controller is configured to cause said first, non-zero fraction of said memristive cells to be programmed in said full SET state and said remaining, second, non-zero fraction of said memristive cells to be programmed in said full RESET state so as to encode corresponding weights of a neural network according to:

$$G_{i,j} = \sum_{k=0}^{n-2} 2^k g_{i,j,k} - 2^{n-1} g_{i,j,n-1};$$

wherein:

i is a row index for rows corresponding to rows of said matrix G and said bit lines;

j is a column index for columns corresponding to columns of said matrix G and said groups of n word lines;

k is a counting index; and g is a conductance of a corresponding one of said memristive cells.

19. The HDL design structure of claim 18, further comprising:

an input vector peripheral circuit coupled to the plurality of word lines; and a control circuit configured to control said input vector peripheral circuit to carry out inferencing with said plurality of memristive cells having said neural network weights stored therein.

20. The HDL design structure of claim 15, wherein said groups of word lines comprise n of said word lines and said addition-subtraction block for each of said groups of n word lines comprises:

n−1 adders configured to add said output of said analog-to-digital converter coupled to said first one of said word lines to said outputs of each of said shifters except for said shifter for said last one of said word lines; and a subtractor configured to subtract said output of said shifter for said last one of said word lines, and to output a result as a corresponding element of said output vector.

* * * * *